US008957816B2

(12) United States Patent
Imbert et al.

(10) Patent No.: US 8,957,816 B2
(45) Date of Patent: Feb. 17, 2015

(54) COMMUNICATION DEVICE, AN AIRCRAFT ROTOR, AND AN AIRCRAFT

(71) Applicant: Airbus Helicopters, Marignane, Cedex (FR)

(72) Inventors: Nicolas Imbert, Marseille (FR); Charles Chuc, Marseille (FR)

(73) Assignee: Airbus Helicopters, Marignane Cedex (FR)

( * ) Notice: Subject to any disclaimer, the term of this patent is extended or adjusted under 35 U.S.C. 154(b) by 134 days.

(21) Appl. No.: 13/741,629

(22) Filed: Jan. 15, 2013

(65) Prior Publication Data

US 2013/0194140 A1    Aug. 1, 2013

(30) Foreign Application Priority Data

Jan. 30, 2012   (FR) ..................... 12 00264

(51) Int. Cl.
*H01Q 1/28*     (2006.01)
*B64C 27/605*   (2006.01)
*B64D 15/12*    (2006.01)
*B64D 45/00*    (2006.01)
*H01Q 7/00*     (2006.01)
*B64C 27/04*    (2006.01)

(52) U.S. Cl.
CPC ............... *H01Q 1/28* (2013.01); *B64C 27/605* (2013.01); *B64D 15/12* (2013.01); *B64D 45/00* (2013.01); *H01Q 7/00* (2013.01); *B64C 27/04* (2013.01)
USPC ............................ 343/705; 343/708; 343/893

(58) Field of Classification Search
CPC ....................................... H01Q 1/28
USPC ..................... 343/705, 708, 893; 416/146 R
See application file for complete search history.

(56) References Cited

U.S. PATENT DOCUMENTS

| 4,026,660 A | 5/1977 | Ueda |
| 4,625,256 A | 11/1986 | Scuka |
| 5,205,710 A | 4/1993 | Engels |
| 5,745,081 A * | 4/1998 | Brown et al. ............. 343/705 |
| 2010/0216398 A1 | 8/2010 | Finn |
| 2011/0186687 A1* | 8/2011 | Elder ...................... 244/155 A |
| 2011/0290942 A1* | 12/2011 | Imbert et al. ............ 244/134 D |

OTHER PUBLICATIONS

Search Report and Written Opinion; Application No. FR 1200264; dated Oct. 3, 2012.

* cited by examiner

*Primary Examiner* — Dieu H Duong
(74) *Attorney, Agent, or Firm* — Brooks Kushman P.C.

(57) ABSTRACT

A communication device (20) for communication between a movable piece of equipment (101) of a rotary rotor (5) and a stationary piece of equipment (102). Said communication device (20) is fitted with a set (10) of controlling swashplates including a rotary swashplate (11) and a non-rotary swashplate (12), the communication device (20) comprising a movable transfer unit (21) and a stationary transfer unit (22) for exchanging information respectively with the movable equipment (101) and with the stationary equipment (102). Each transfer unit (21, 22) is connected to a respective transmit-and-receive antenna (31, 32), including a movable antenna (31) connected to the movable transfer unit (21) and fastened to the rotary swashplate (11) and a stationary antenna (32) connected to the stationary transfer unit (22) and fastened to the non-rotary swashplate (12), the movable antenna (31) and the stationary antenna (32) being suitable for communicating with each other wirelessly.

8 Claims, 1 Drawing Sheet

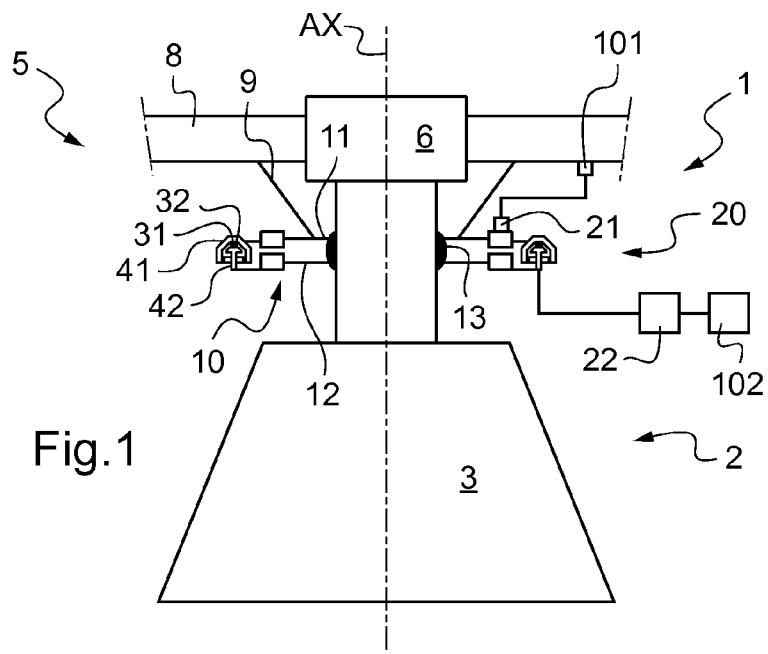
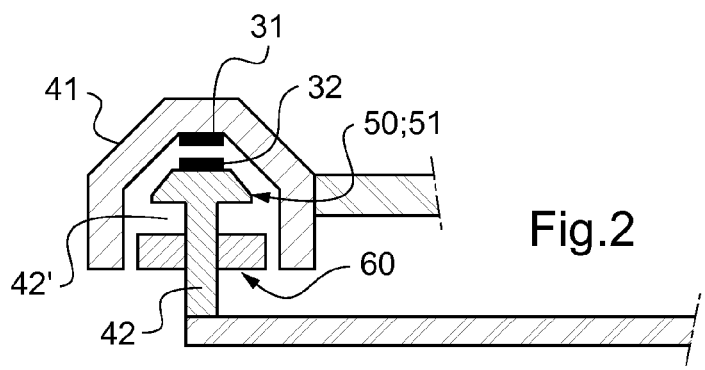
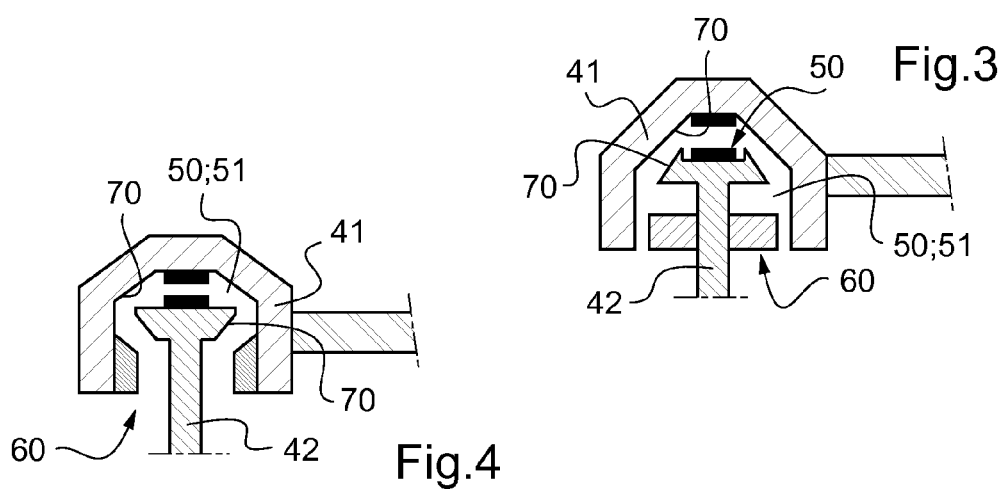

COMMUNICATION DEVICE, AN AIRCRAFT ROTOR, AND AN AIRCRAFT

CROSS REFERENCE TO RELATED APPLICATIONS

The present application claims priority to French patent application No. FR 12/00264 filed on Jan. 30, 2012, the disclosure of which is incorporated in its entirety by reference herein.

BACKGROUND OF THE INVENTION (1) Field of the Invention

The present invention relates to a communication device for communicating between a rotary assembly and a non-rotary assembly, to an aircraft rotor fitted with the communication device, and to an aircraft fitted with the rotor.

(2) Description of Related Art

The invention thus lies in the technical field of means for transmitting data between equipment located in a stationary frame of reference and equipment located in a moving frame of reference. The data may be defined in a digital format.

Transmission must be reliable and advantageously should not give rise to any significant disturbances such as electrical disturbances. These characteristics are looked for in particular in an application restricted to the field of aviation which is particularly constraining and demanding.

Electrical connector devices comprising slip rings and brushes are known, having a non-rotary portion and a rotary portion that are connected together by the brushes. By way of example, the non-rotary portion has circular electrically-conductive tracks and the rotary portion has respective brushes traveling over each of the tracks.

In a rotary wing aircraft, the non-rotary portion may power a plurality of heater mats present on the blades of the rotary wing, and it may power them in application of a sequence that is programmed in the electrical unit for the purpose of de-icing or of preventing ice from forming on the blades. Each mat is then connected by an electric cable to a brush of the rotary portion of the slip-ring assembly.

Such a slip-ring assembly is heavy, in particular because of the large number of electrical cables and of electric tracks.

The slip-ring assembly is thus easy to install on a heavy rotorcraft with a powerful power plant. However, installing it on a medium weight rotorcraft can be difficult.

It also appears to be difficult to install such a slip-ring assembly in temporary manner, e.g. for the purpose of performing spot tests on a rotorcraft over a limited period of time.

In addition, the friction between each brush and the corresponding track tends to degrade the performance of the slip-ring assembly. Such wear can give rise to noise that interferes with the signals being transmitted. Maintenance actions requiring the assembly to be disassembled therefore need to be performed relatively frequently. Unfortunately, a slip-ring assembly is sometimes difficult to access, so the cost of maintenance can be high and leads to the rotorcraft being out of operation for a long time.

A slip-ring assembly can have only a limited number of data inputs and thus of data outputs.

Document US 2010/0216398 describes a rotorcraft, the rotorcraft having a rotor mast supporting and driving a hub of a rotor of the rotorcraft.

The rotorcraft includes a communication device having a movable communication module and a stationary communication module. The rotor mast also has a hollow shaft forming part of the communication device.

An antenna of the movable communication module communicates with an antenna of the stationary communication module, at least in part via the rotor mast.

That communication device is advantageous. Nevertheless, it clearly presents the drawback of using the mast of a rotor. Under such circumstances, incorporating it in an already-existing aircraft can naturally be difficult.

Wireless data transmission devices are also known, in particular devices that use optical means.

Document U.S. Pat. No. 4,625,256 belongs to a technical field remote from the invention. That document describes a spark-gap for protecting a mechanical assembly from an electric current generated by lightning.

The following documents are also known: U.S. Pat. Nos. 5,205,710; 4,026,660; and US 2010/216398.

BRIEF SUMMARY OF THE INVENTION

An object of the present invention is to propose a communication device for communication between a rotary assembly and a non-rotary assembly, which device is robust and reliable, the device being suitable for being incorporated in an existing aircraft and tending to minimize the maintenance actions required.

The invention thus relates to a communication device for providing communication between a movable piece of equipment of a rotor that is rotatable about an axis of rotation and a stationary piece of equipment that is placed on a carrier structure carrying said rotor.

The communication device is fitted with a set of controlling swashplates including a rotary swashplate and a non-rotary swashplate for pitch control of blades of the rotor. The communication device also includes a movable transfer unit and a stationary transfer unit for exchanging information respectively with the movable equipment and with the stationary equipment. By way of example, each transfer unit may modify information coming from one of the pieces of equipment by transforming it from a digital form to an electromagnetic signal, and vice versa.

The communication device is remarkable in particular in that each transfer unit is connected to a transmit-and-receive antenna, a movable antenna connected to the movable transfer unit being fastened to the rotary swashplate and a stationary antenna connected to the stationary transfer unit being fastened to the non-rotary swashplate, the movable antenna and the stationary antenna being suitable for communicating with each other wirelessly and without involving a hollow shaft.

It can be understood that the members that are said to be "movable" perform rotary movement together with the rotor, whereas the members said to be "stationary" do not perform such rotary movement together with the rotor, but they do move together with the carrier structure.

Reference may be made to the state of the art in order to obtain information about a set of controlling swashplates that is usually hinged to an outer periphery of a rotor mast.

Similarly, reference may be made to the state of the art in order to obtain information about transfer units interfaced between a piece of equipment and an antenna.

Under such circumstances, the communication device has two antennas placed facing each other to communicate wirelessly with each other, each antenna being secured to one of the swashplates of a set of controlling swashplates.

The communication device can thus easily be arranged on an existing aircraft insofar as it is interfaced with the controlling swashplate and not inside an existing member such as a mast. Similarly, the device can be removed, thus enabling it to be used on a temporary basis, e.g. for testing.

The communication device is easy to maintain, since the communication device is accessible from the outside.

Furthermore, it may be observed that the communication device uses members that are tried and tested such as antennas, thereby enhancing its reliability.

The communication device may also include one or more of the following additional characteristics.

For example, communication device may have a rotary ring secured to a rotary swashplate and carrying the movable antenna, together with a non-rotary ring secured to the non-rotary swashplate and carrying the stationary antenna facing the movable antenna.

Each ring may be a component part of the associated swashplate, or it may be secured to the associated swashplate by conventional fastener means. Each ring may optionally be made as a single piece, or it may be built up from a plurality of arcs.

Each ring may be located at the outer periphery of the corresponding swashplate.

In addition, at least one antenna is a circular antenna. In a preferred embodiment, the movable antenna and the stationary antenna are both circular.

This shape makes it possible to ensure that information is transmitted over a complete revolution of the rotor without any loss of signal.

For example, each antenna may be made directly on a printed circuit that is fastened to a ring. This technology makes it possible to obtain antennas in a variety of shapes using multiple conductive materials.

In another aspect, at least one ring presents a groove receiving the antenna. The groove serves at least to limit the electromagnetic disturbances generated by the corresponding antenna. The groove represents an electromagnetic shielding effect.

Furthermore, a ring may present a groove receiving an antenna and encompassing the other ring.

For example, the rotary ring has a U-shaped section defining a cavity in which the movable antenna and the non-rotary ring fitted with the stationary antenna are received.

The cavity then tends to limit the electromagnetic emissions from the two antennas.

In addition, the U-shaped section faces towards the stationary ring with the end wall of the cavity facing the stationary ring. Thus, the movable ring projects both antennas against the outside environment, and in particular against rain which cannot penetrate into the cavity.

The cavity is also small. The cavity thus facilitates electromagnetic exchange between the two antennas, thereby enabling considerable energy savings relating to transmission.

The device may also include a gasket partially closing the cavity in order to minimize the electromagnetic flux emitted by the antennas out from the cavity, and also to minimize the penetration of dust into the cavity.

Since such dust may degrade the transmission of information from one antenna to the other, at least one of the rings is optionally provided with antistatic paint on a surface that defines the cavity.

In addition to a communication device, the present invention provides a rotor provided with a hub carrying a plurality of variable-pitch blades, and a mast carrying said hub, the rotor having a communication device for communication between a movable piece of equipment of the rotor and a stationary piece of equipment placed on a carrier structure for carrying the rotor, said rotor also having a communication device fitted with a controlling swashplate assembly including a rotary swashplate and a non-rotary swashplate hinged to said mast in order to control said pitch of the blades, said communication device comprising a movable transfer unit and a stationary transfer unit for exchanging information respectively with the movable equipment and with the stationary equipment.

The device is then a device of the above-described type in accordance with the invention.

Similarly, the invention also provides an aircraft fitted with a rotor and a carrier structure for carrying the rotor, the rotor being of the above-described type.

BRIEF DESCRIPTION OF THE SEVERAL
VIEWS OF THE DRAWINGS

The invention and its advantages appear in greater detail in the context of the following description of embodiments given by way of illustration and with reference to the accompanying figures, in which:

FIG. 1 is a diagram showing an aircraft of the invention; and

FIGS. 2 to 4 show variants of a communication device of the invention.

DETAILED DESCRIPTION OF THE INVENTION

Elements that are present in more than one of the figures are given the same references in each of them.

FIG. 1 shows a rotorcraft 1 having a carrier structure 2 carrying a rotor 5 via a main gearbox (MGB) 3, for example.

The rotor 5 includes a hub 6 carrying a plurality of variable-pitch blades 8. Furthermore, the rotor 5 has a rotor mast 7 connecting the hub 6 to the MGB 3.

Under such circumstances, the Main Gearbox 3 drives the rotor mast 7 in rotation about the axis of rotation AX, the rotor mast 7 causing the hub 6 to rotate and thus the blades 8.

In order to modify the pitch of the blades 8, the aircraft has a set 10 of controlling swashplates hinged on a hinge 13 of the rotor mast 7.

This set 10 comprises a rotary swashplate 11 constrained to rotate with the rotor 5 and co-operating with a non-rotary swashplate 12 secured to the carrier structure 2. Control means (not shown) act on the non-rotary swashplate 12 to cause it to move in translation along the rotor mast 7 and/or in pivoting relative to the rotor mast 7. The non-rotary swashplate 12 transfers its movement to the rotary swashplate 11 which modifies the pitch of the blades 8 accordingly via rods 9.

The aircraft also includes at least one piece of movable equipment 101 constrained to rotate with the rotor 5 about the axis of rotation AX and at least one piece of stationary equipment 102 secured to the carrier structure 2, such as pieces of electronic equipment.

The rotor 5 then includes a communication device 20 for enabling the movable equipment 101 to exchange information with the stationary equipment 102, and vice versa.

The communication device then comprises a movable transfer unit 21 connected by a wired connection to the movable equipment 101. The movable transfer unit 21 is constrained to rotate with the rotor 5, e.g. being fastened to a blade 8, to the rotor mast 7, to the hub 6, or indeed to the rotary swashplate 11.

Likewise, the communication device includes a stationary transfer unit 22 connected by a wired connection to the stationary equipment 102. The stationary transfer unit 22 is connected to the carrier structure 2 in such a manner that it does not rotate with the rotor 5 about the axis of rotation AX.

Each transfer unit may convert digital information into an electromagnetic signal, or vice versa.

Furthermore, the communication device includes the rotary and non-rotary swashplates 11 and 12. Each swashplate 11, 12 is constrained in rotation about the axis of rotation AX with a respective transmit-and-receive antenna, and these two transmit-and-receive antennas can communicate with each other.

Consequently, a movable antenna 31 of the communication device 10 is fastened to the rotary swashplate 11, this movable antenna being connected by a wired connection to the movable transfer unit 21. Likewise, a stationary antenna 32 of the communication device 10 is fastened to the non-rotary swashplate 12, this stationary antenna being connected by a wired connection to the stationary transfer unit 22.

The movable antenna 31 and the stationary antenna 32 optionally face each other in order to optimize communication between them, the movable antenna 31 being above the stationary antenna 32.

Thus, the stationary equipment 102 can generate a digital signal that is transformed into an electromagnetic signal by the stationary transfer unit 22. The electromagnetic signal is sent to the stationary antenna 32 which transmits it to the movable antenna 31. The electromagnetic signal then reaches the movable transfer unit 21 which transforms it into a digital signal that is sent to the movable equipment 101.

Likewise, a movable signal generated by the movable equipment 101 may be sent to the stationary equipment 102 by the communication device 20.

Each antenna may be a circular antenna fastened to one of the swashplates of the set 10.

Each antenna may also be fastened to a ring, which ring may form part of a swashplate or may be fastened thereto.

Under such circumstances, the communication device 20 may comprise a movable antenna 41 secured to the rotary swashplate 11 in order to carry the movable antenna 31, and a stationary antenna secured to the non-rotary swashplate 12 in order to carry the stationary antenna 32.

With reference to FIG. 2, at least one ring may include a groove 50 serving in particular to receive the corresponding antenna.

For example, the movable ring 41 includes such a groove 50 in particular for receiving the movable antenna 31.

Thus, the movable ring may present a U-shaped section defining a groove 50 representing a cavity 51. Consequently, the movable antenna 31, the stationary antenna 32, and at least a distal portion 42' of the stationary ring 42 carrying the stationary antenna 32 may be arranged in the cavity 51.

With reference to FIG. 3, each of the rings may include a respective groove 50.

The movable antenna 41 and the stationary antenna 42 are then sheltered from rain. In addition, the electromagnetic signals exchanged between the movable antenna 31 and the stationary antenna 42 tend to be contained within the cavity.

In order to optimize these two advantages, it is possible to provide a gasket that partially closes the cavity 51. The closure is partial in order to avoid impeding the rotary movement of the movable ring 41.

The gasket 60 may then be fastened to the movable ring 41 as shown in FIG. 4 or to the stationary ring 42, as shown in FIG. 3.

Furthermore, the surfaces of the stationary ring 42 and of the movable ring 41 defining the cavity 51 may be covered at least in part in an antistatic paint 70.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A communication device for providing communication between a movable piece of equipment of a rotor rotatable about an axis of rotation (AX), and a stationary piece of equipment placed on a carrier structure for said rotor, said communication device being fitted with a set of controlling swashplates including a rotary swashplate and a non-rotary swashplate for pitch control of blades of said rotor, said communication device comprising a movable transfer unit and a stationary transfer unit that exchange information respectively with the movable equipment and with the stationary equipment, wherein each transfer unit is connected to a respective transmit-and-receive antenna, including a movable antenna connected to the movable transfer unit and fastened to the rotary swashplate and a stationary antenna connected to the stationary transfer unit and fastened to the non-rotary swashplate, the movable antenna and the stationary antenna being suitable for communicating with each other wirelessly, the communication device including firstly a rotary ring secured to the rotary swashplate and carrying the movable antenna and secondly a non-rotary ring secured to the non-rotary swashplate and carrying the stationary antenna facing the movable antenna, at least one of the swashplates presenting a groove receiving an antenna.

2. A communication device according to claim 1, wherein at least one antenna is a circular antenna.

3. A communication device according to claim 1, wherein a ring presents a groove receiving an antenna and encompassing the other ring.

4. A communication device according to claim 1, wherein said rotary ring has a U-shaped section defining a cavity in which the movable antenna and the non-rotary ring fitted with the stationary antenna are received.

5. A communication device according to claim 4, wherein the communication device includes a gasket partially closing said cavity.

6. A communication device according to claim 4, wherein at least one ring is provided with antistatic paint on a surface defining said cavity.

7. A rotor provided with a hub carrying a plurality of variable-pitch blades, and a mast carrying said hub, said rotor having a communication device for communication between a movable piece of equipment of the rotor and a stationary piece of equipment placed on a carrier structure for carrying the rotor, said rotor having a communication device fitted with a controlling swashplate assembly including a rotary swashplate and a non-rotary swashplate hinged to said mast in order to control said pitch of the blades, said communication device comprising a movable transfer unit and a stationary transfer unit for exchanging information respectively with the movable equipment and with the stationary equipment, wherein said communication device is a device according to claim 1.

8. An aircraft having a rotor and a carrier structure for carrying the rotor, wherein said rotor is a rotor according to claim 7.

* * * * *